(12) United States Patent
Debras et al.

(10) Patent No.: US 6,624,110 B2
(45) Date of Patent: Sep. 23, 2003

(54) PRODUCTION OF ZIEGLER-NATTA CATALYSTS

(75) Inventors: Guy Debras, Frasnes Lez Gosselies (BE); Christian Lamotte, Arquennes (BE)

(73) Assignee: Fina Research, S.A., Feluy (BE)

( * ) Notice: Subject to any disclaimer, the term of this patent is extended or adjusted under 35 U.S.C. 154(b) by 59 days.

(21) Appl. No.: 09/760,681

(22) Filed: Jan. 16, 2001

(65) Prior Publication Data

US 2001/0016553 A1 Aug. 23, 2001

Related U.S. Application Data

(63) Continuation of application No. 09/296,917, filed on Apr. 22, 1999, now abandoned.

(30) Foreign Application Priority Data

Apr. 24, 1998 (EP) .............................. 98107495

(51) Int. Cl.⁷ ......................... B01J 27/135; B01J 27/138
(52) U.S. Cl. ....................... 502/226; 502/227; 502/340; 502/350
(58) Field of Search ................................. 502/224, 226, 502/227, 309, 340, 350

(56) References Cited

U.S. PATENT DOCUMENTS

| | | | | |
|---|---|---|---|---|
| 4,315,088 A | 2/1982 | Kitagawa et al. | ........... | 526/125 |
| 4,404,341 A | 9/1983 | Ushida et al. | ............... | 526/125 |
| 4,421,674 A | 12/1983 | Invernizzi et al. | .......... | 502/154 |
| 4,442,225 A | 4/1984 | Takitani et al. | ............. | 502/112 |
| 4,686,199 A | 8/1987 | Tachikawa et al. | ......... | 502/104 |
| 4,931,526 A | 6/1990 | Yoshitake et al. | .......... | 526/336 |
| 4,948,770 A | 8/1990 | Job | ............................ | 502/107 |
| 5,221,651 A | 6/1993 | Sacchetti et al. | ........... | 502/126 |
| 5,348,925 A | 9/1994 | Milani et al. | ............... | 502/115 |

FOREIGN PATENT DOCUMENTS

| | | |
|---|---|---|
| BE | 744221 | 7/1970 |
| EP | 0015099 | 9/1980 |
| EP | 0344755 | 12/1989 |

*Primary Examiner*—M. Alexandra Elve
*Assistant Examiner*—Christina Ildebrando
(74) *Attorney, Agent, or Firm*—William D. Jackson

(57) ABSTRACT

A process for producing a Ziegler-Natta catalyst, the process comprising reacting an organo magnesium compound with a halogenated compound to produce crystalline magnesium halide having an intense diffraction line in an x-ray spectrum thereof at lattice distance within the range of from 2.56 to 3.20 Angstroms and titanating the magnesium halide by mixing the magnesium halide with a titanium compound whereby the titanated magnesium halide hasp in an x-ray spectrum thereof, a halo appearing at a lattice distance within the range from 2.56 to 3.30 Angstroms.

20 Claims, No Drawings

PRODUCTION OF ZIEGLER-NATTA CATALYSTS

This is a continuation of application Ser. No. 09/296,917, filed Apr. 22, 1999, now abandoned.

BACKGROUND TO THE INVENTION

The present invention relates to a process for the production of Ziegler-Natta catalysts, and in particular to the production of such a catalyst comprising titanated magnesium chloride.

DESCRIPTION OF THE PRIOR ART

U.S. Pat. No. 4,636,486 discloses a chemical preparation process for a magnesium halide supported Ziegler-Natta catalyst. The most active anhydrous magnesium chloride is obtained when its x-ray diffraction spectrum is characterised by a broadened halo appearing at a lattice distance (d) within the range of from 2.56 to 2.95 Angstroms. This may be compared to a very crystalline magnesium chloride which exhibits an intense diffraction line at a lattice distance (d) of 2.56 Angstroms. Thus this prior patent document discloses that a polymerisation catalyst based on anhydrous magnesium dichloride has improved activity.

The chemical process disclosed in this document is a multi-step procedure and the activity of the catalyst is not particularly high.

U.S. Pat. No. 4,650,778 discloses the production of metal halide particles useful as olefin polymerisation catalyst precursors by vaporising the metal halide and then condensing it in the presence of a diluent.

It is also known for example from EP-A-0654444 and EP-A-0654485 to produce powder catalysts based on magnesium chloride, titanium chloride and at least an electron donor by using a plasma torch which vaporises the compounds introduced into the plasma torch and the vapour is condensed to form a fine magnesium chloride powder covered with titanium chloride. The powder is employed as a catalyst in the polymerisation of alpha-olefins.

While those latter two prior specifications, both of which are in the name of the present applicant, disclose the production of catalysts having good activity in the polymerisation of alpha-olefins, nevertheless there is the demand for such catalysts produced by a chemical process yet with high activity.

EP-A-0015099 discloses a variety of different methods for producing a Ziegler-Natta catalyst comprising titanated magnesium chloride. The process includes pulverising with a phosphorous compound a magnesium halide until a halo appears in the x-ray diffraction spectrum, and thereafter treating the pulverised product with liquid titanium halide to fix a titanium compound thereon.

BE-A-744221 discloses the production of Ziegler-Natta catalysts in which anhydrous magnesium chloride and titanium oxychloride are reacted together to form a product in which the x-ray diffraction spectrum has an intense line at a lattice distance (d) of 2.56 Angstroms EP-A-0344755 discloses the production of Ziegler-Natta catalysts in which a magnesium compound is transformed into a magnesium dihalide by using an halogenating agent and thereafter the magnesium dihalide is reacted with a titanium or vanadium compound. It is disclosed that the magnesium dihalide has a halo in the x-ray diffraction spectrum.

For each of EP-A-0015099 and EP-A-0344755, the magnesium dihalide which is reacted with the titanium compound has a halo in the x-ray diffraction spectrum, indicating that the magnesium dihalide is not crystalline but rather is present as a disordered phase.

SUMMARY OF THE INVENTION

The present invention provides a process for producing a Ziegler-Natta catalyst, the process comprising reacting an organo magnesium compound with a halogenated compound to produce crystalline magnesium halide having an intense diffraction line in an x-ray spectrum thereof at a lattice distance within the range of from 2.56 to 3.20 Angstroms and titanating the magnesium halide by mixing the magnesium halide with a titanium compound whereby the titanated magnesium halide has, in an x-ray spectrum thereof, a halo appearing at a lattice distance within the range from 2.56 to 3.30 Angstroms.

The crystalline magnesium halide which is titanated in accordance with the process of the invention has a high degree of crystallinity as represented by the crystalline magnesium halide having an intense diffraction line at a lattice distance of from 2.56 to 3.20 Angstroms in the x-ray powder spectrum thereof. For example, when the halide is chloride, the intense diffraction line is at a lattice distance of 2.56 Angstroms. When the halide is bromide or iodide, the intense diffraction line is respectively at 2.93 or 3.19 Angstroms. Thus in accordance with the present invention a crystalline magnesium halide is titanated and in the titanation step the highly crystalline nature of the magnesium halide is destroyed to produce a titanated compound having a high degree of disorder, as reflected by the appearance of a halo in the x-ray diffraction spectrum instead of an intense diffraction line. In contrast, some of the known methods described hereinabove titanate not a crystalline magnesium halide, but a magnesium halide which already has a high level of disorder and thus exhibits already a halo in the x-ray spectrum. The present inventors have found that by titanating a crystalline magnesium halide to produce a titanated magnesium halide having disorder as represented by the halo in the x-ray spectrum, improved catalyst activity is achieved.

The magnesium halide preferably comprises magnesium chloride. It may alternatively comprise magnesium bromide or magnesium iodide.

The organo magnesium compound may comprise a magnesium organo-halide such as phenyl magnesium chloride or a magnesium alkoxide such as magnesium di(methyl 2 pentyloxide) or magnesium diethoxide.

The halogenated compound may comprise a substituted or unsubstituted silicon chloride, such as silicon dichloride diethoxide (($C_2H_5O)_2SiCl_2$); diphenyl silicon dichloride (($C_6H_5)_2SiCl_2$); phenyl silicon trichloride ($C_6H_5SiCl_3$); triphenyl silicon chloride ($C_6H_5)_3SiCl$) dimethyl silicon dichloride (($CH_3)_2SiCl_2$) or silicon tetrachloride. Typical chemical reactions for synthesising the magnesium chloride product are the reaction of phenyl magnesium chloride with diethoxy silicon dichloride; the reaction of magnesium dimethyl 2 pentyloxide) with diphenyl silicon dichloride ; or the reaction of magnesium diethoxide with dimethyl silicon dichloride, diphenyl silicon dichloride or silicon tetrachloride. For each reaction, the synthesis forms, in addition to the magnesium chloride, an electron donor. Thus the magnesium dichloride synthesis yields in-situ generation of an electron donor e.g. diphenyl diethoxy silane, diphenyl di(methyl 2 pentoxy) silane, dimethyl diethoxysilane or diethoxy dichlorosilane. This can assist in the formation of a highly crystalline magnesium chloride having a very intense diffraction line at a lattice distance of 2.56 Angstroms in the x-ray powder spectrum thereof. The electron donor is retained in the magnesium chloride support for the Ziegler-Natta catalyst. This in turn yields a silicon content for the support when the halogenated compound includes silicon.

Typically, the magnesium chloride synthesis is carried out by reacting the organomagnesium compound with the halogenated compound in an organic solvent at a temperature of from 20 to 60° C. for a period of from 3 to 72 hours. Typically, the molar ratio of magnesium in the organomagnesium compound to chlorine in the chlorine compound is from 0.5 to 2. The organic solvent may comprise tetrahydrofuran (THF), heptane, xylene, dichloroethane or other suitable organic solvents.

The magnesium dichloride preferably is separated from the organic solvent, for example by a centrifuge, and is then washed with an organic solvent.

The magnesium chloride product as synthesised is then titanated, preferably by pouring the magnesium chloride into liquid titanium chloride. The resultant mixture is preferably held at a temperature of from 20 to 135° C. for a period of from 0.5 to 2 hours. Thereafter, the titanated magnesium chloride may be separated from the titanium tetrachloride e.g. by filtration or by a centrifuge and washed with an organic solvent.

The present invention also provides a process for polymerising an olefin in the presence of the catalyst produced in accordance with the invention.

DETAILED DESCRIPTION OF THE PREFERRED EMBODIMENTS

The present invention will now be described with reference to the following non-limiting Examples.

EXAMPLE 1

In this Example a precursor for a Ziegler-Natta catalyst comprising titanated magnesium chloride was prepared initially by reacting phenyl magnesium chloride in tetrahydrofuran (THF) as an organic solvent with diethoxy dichlorosilane. The diethoxy dichloroilane was synchesised by adding 2 moles of ethanol to 1 mole of silicon tetrachloride. Initially, 400 milimoles of phenyl magnesium chloride in 300 ml of tetrahydrofuran were reacted with 265 milimoles of diethoxy silicon dichloride at a temperature of 25° C. for a period of 3 hours. Thereafter, the solid product was first recovered by adding heptane and separated by using a centrifuge. The product was then washed three times with heptane at a temperature of 25° C.

The x-ray powder diffraction spectrum of the resultant magnesium chloride powder was obtained and this indicated an intense diffraction pattern. This in turn indicated that the magnesium chloride was highly crystalline.

Thereafter, 46 mg of the magnesium chloride product were mixed with 846 milimoles (93 ml) of titanium tetrachloride in liquid form at a temperature of 135° C. for a period of 2 hours. The titanated magnesium chloride was separated from the liquid by a centrifuge. The separated solid was then washed seven times with heptane at 25° C. The x-ray diffraction pattern of the titanated magnesium chloride was then obtained and the spectrum showed a broad halo appearing at a lattice distance within the range from 2.56 to 2.95 Angstroms.

The resultant titanated magnesium chloride was then subjected to a propylene polymerisation test. In that test, the reactor volume comprised 4.5 liters and 2.4 liters of liquid propylene and 1.5 liters of hydrogen were introduced into the reactor together with from 10 to 25 mg of the titanated magnesium chloride catalyst. The polymerisation was carried out for a period of 2 hours at a temperature of 70° C. The polymerisation is carried out in the presence of, in addition to the Ziegler-Natta catalyst produced in accordance with the invention, an additional cocatalyst comprising a metal alkyl, in particular triethyl aluminium (TEAL). The polymerisation is further effected in the presence of an electron donor in addition to the electron donor produced during the synthesis of the magnesium chloride support and which is retained in that support. The additional electron donor contains additional silicon and preferably comprises an alkoxysilane such as phenyl triethoxy silane, methyl cyclohexyl dimethoxy silane or alternatively a diether such as 2,2 diisobutyl 1,3 dimethoxypropane, dicyclopentyl dimethoxysilane, 2 isopropyl 2 isobutyl 1,3 dimethoxy propane or 2,2 dicyclopentyl 1,3 dimethoxypropane. The presence of (a) the aluminium alkyl cocatalyst and (b) the added silicon-containing electron donor as well as the silicon electron donor produced in the $MgCl_2$ synthesis yielded an aluminium/silicon atomic ratio in the overall catalyst system of around 20.

Three runs of the propylene polymerization test were performed, with the three runs having a polypropylene yield, in terms of grams of polypropylene per gram of catalyst, of 10402, 12967 and 13767 respectively. For the second run having a polypropylene yield of 12967, the polypropylene had a melt flow index (MFI) as determined by ASTM D 1238 using a load of 2.16 kg at 230° C. of 23.8 g/10 min.

This Example demonstrates that by manufacturing a titanated magnesium chloride Ziegler-Natta catalyst having initially a highly crystalline magnesium chloride and subsequently a titanated magnesium chloride having a broad halo in the x-ray diffraction spectrum, the catalyst has a high activity for alpha-olefin polymerisation. The halo indicates the presence of a disordered phase in the magnesium chloride support. The titanium tetrachloride treatment transforms a highly crystalline structure into a highly active catalyst having such a halo in its x-ray diffraction spectrum and during the transformation step, large crystals of $MgCl_2$ are strongly reduced in size. This in turn increases the activity of the catalyst.

EXAMPLE 2

In this Example, Example 1 was repeated but in the manufacture of the magnesium chloride 750 milimoles of phenyl magnesium chloride were reacted with 1500 milimoles of diethoxy silicon dichloride in 105 ml of THF at a temperature of 25° C. for a period of 18 hours. After separation and washing of the magnesium chloride product as in Example 1, the x-ray diffraction spectrum of the magnesium chloride showed it to be highly crystalline, with highly intense peaks.

The magnesium chloride was then titanated in a manner similar to that employed in Example 1. 67.3 mg of magnesium chloride were mixed with 1288 milimoles (141.6 ml) of titanium tetrachloride at a temperature of 20° C. for a period of 0.5 hours. Thereafter, the titanated magnesium chloride was mixed with a further 1365 milimoles (150 ml) of titanium tetrachloride for a period of 2 hours at a temperature of 100° C. Again, the product was separated by filtration and washing as in Example 1.

The titanated magnesium chloride was then subjected to the propylene polymerisation test as specified in Example 1.

Five runs were performed, respectively having a polypropylene yield of 35720, 32781, 21398, 26901 and 22598, each being expressed as the amount of polypropylene produced in grams per gram of catalyst. For the first run, the MFI of the polypropylene was 22.9 g/10 min.

EXAMPLE 3

In this Example, the magnesium chloride was prepared by reacting magnesium diethoxide with silicon tetrachloride and thereafter the resultant magnesium chloride was titanated. In the first step of the process. 545 milimoles of magnesium diethoxide in 120 ml of heptane were added to 1047 milimoles of silicon tetrachloride. The mixture was held at a temperature of 60° C. for a period of 72 hours. Thereafter, the MgCl$_2$ product was recovered using heptane as a hydrocarbon medium at a temperature of 25° C. The solid product was then separated by a centrifuge and washed three times with heptane at 25° C.

The resultant product was subjected to x-ray diffraction analysis and the x-ray diffraction spectrum showed a highly crystalline magnesium chloride. Thereafter, the magnesium chloride was titanated by adding 32 mg of the magnesium chloride to 600 milimoles of titanium tetrachloride (66 ml TiCl$_4$) at a temperature of 105° C. for a period of 2 hours. The titanated magnesium chloride was recovered by using a centrifuge and using heptane as the recovery medium at a temperature of 25° C. Finally, the titanated magnesium chloride was washed seven times with heptane at 25° C.

The resultant product was then analysed by x-ray diffraction and the x-ray diffraction spectrum showed a broad halo at a lattice distance within the range from 2.56 to 2.95 Angstroms.

The titanated magnesium chloride was then employed as an alpha-olefin polymerisation catalyst in the polymerisation test of Example 1. In two runs, the polypropylene yield was 16304 and 16411 grams of polypropylene per gram of catalyst respectively, and in the first run the polypropylene had an MFI of 29.1 g/10 min.

Comparative Example 1

In this Comparative Example, Example 1 was repeated but in the titanation step the conditions were varied. Specifically, in the titanation step 44 mg of the magnesium chloride product were mixed with 801 milimoles (88 ml) of titanium tetrachloride and 66 milimoles of di isobutylphthalate at a temperature of 100° C. for a period of 2 hours. Following the same separation step as in Example 1, the titanated magnesium chloride was subjected to an x-ray diffraction analysis and to a propylene polymerisation test. In the x-ray diffraction analysis, the x-ray diffraction pattern showed the titanated magnesium chloride to have, rather than a halo in the x-ray diffraction pattern as in Example 1, a crystalline diffraction pattern. In the propylene polymerisation test, the polypropylene yield was only 1084 gram polypropylene/gram catalyst. This is significantly less than for Example 1, showing that the catalyst has significantly reduced alpha-olefin polymerisation activity.

Comparative Example 2

In Comparative Example 2, Example 2 was repeated but using a different titanation step. In the titanation step of Comparative Example 2, 59 mg of the magnesium chloride product produced in accordance with Example 2 were mixed with 1000 milimoles (10 ml) of titanium tetrachloride at a temperature of 105° C. for a period of 2 hours. Following the same separation and washing step as in Example 1, the titanated magnesium chloride was subjected to an x-ray diffraction analysis and to a polypropylene polymerisation test. The x-ray diffraction analysis showed that the titanated magnesium chloride had a crystalline pattern and did not exhibit a halo in the x-ray diffraction spectrum. In the propylene polymerisation test, the polypropylene yield was only 6692 grams polypropylene/gram catalyst. Again, this showed that the catalyst had reduced activity to alpha-olefin polymerisation.

Comparative Example 3

In this Comparative Example, Example 3 was repeated but using a different precursor as the halogenated compound and different conditions for producing the magnesium chloride, and also using different conditions for the titanation process. In Comparative Example 3, 245 milimoles of magnesium diethoxide in 150 ml of heptane were mixed with 428 milimoles of diphenyl silicon dichloride at a temperature of 96° C. for a period of 504 hours. Using a recovery medium of hexane at a temperature of 25° C., the solid product was recovered and then separated by a centrifuge and washed for three times with heptane at a temperature of 25° C.

The x-ray diffraction spectrum of the resultant magnesium chloride showed a halo in the diffraction pattern at a lattice distance of from 2.56 to 2.95 Angstroms. This demonstrates that the magnesium chloride did not have a highly crystalline structure, as was present in Examples 1 to 3.

Thereafter, the magnesium chloride was subject to titanation wherein 66 mg of the magnesium chloride was mixed with 935 milimoles (100 ml) of titanium tetrachloride at a temperature of 105° C. for a period of 2 hours. The titanated magnesium chloride was recovered by filtration using hexane at a temperature of 25° C. Thereafter, the titanated magnesium chloride was washed seven times with heptane at 25° C. The resultant titanated magnesium chloride was then again subjected to an x-ray diffraction analysis which showed a halo in the x-ray diffraction spectrum, similar to the halo in the pre-titanated magnesium chloride. The titanated magnesium chloride was also used in a propylene polymerisation test as in Example 1. For two runs, the polypropylene yield was 2586 and 3125 grams polypropylene/gram catalyst respectively. This shows considerably reduced activity for alpha-olefin polymerisation as compared to the catalyst of Examples 1 to 3.

What is claimed is:

1. A process for producing a Ziegler-Natta catalyst, the process comprising reacting an organo magnesium compound with a halogenated compound to produce crystalline magnesium halide having a high degree of crystallinity an&an intense diffraction line in an x-ray spectrum thereof at lattice distance within the range of from 2.56 to 3.20 Angstroms and titanating the magnesium halide by mixing the magnesium halide with a titanium compound to destroy the high degree of crystallinity to produce a titanated magnesium halide having disorder, whereby the titanated magnesium halide has, in an x-ray spectrum thereof, a halo appearing at a lattice distance within the range from 2.56 to 3.30 Angstroms.

2. A process according to claim 1 wherein the magnesium halide comprises magnesium chloride.

3. A process according to claim 1 wherein the organo magnesium compound comprises a magnesium organo halide or a magnesium alkoxide.

4. A process according to claim 3 wherein the magnesium organo halide comprises phenyl magnesium chloride and the magnesium alkoxide comprises magnesium di(methyl 2 pentyloxide) or magnesium diethoxide.

5. A process according to claim 1 wherein the halogenated compound comprises a substituted or unsubstituted silicon chloride;

silicon dichloride diethoxide (($C_2H_5O)_2SiCl_2$);

diphenyl silicon dichloride (($C_6H_5$)$_2$SiCl$_2$);

dimethyl silicon dichloride (($CH_3$)$_2$SiCl$_2$) or silicon tetrachloride.

6. A process according to claim 1 wherein the magnesium halide is formed by reacting the organo magnesium compound with the halogenated compound at a temperature of from 20 to 60° C. for a period of from 3 to 72 hours in an organic solvent.

7. A process according to claim 6 wherein the molar ratio of magnesium in the organo magnesium compound to halide in the halogenated compound is from 0.5 to 2.

8. A process according to claim 1 wherein the magnesium halide is titanated by contact with titanium tetrachloride.

9. A process according to claim 8 wherein the titanation step is carried out at a temperature of from 20 to 135° C. for a period of from 0.5 to 2 hours.

10. A process for producing a Ziegler-Natta catalyst, the process comprising reacting an organo magnesium compound selected from a magnesium organo halide and a magnesium alkoxide with a halogenated compound selected from a substituted or unsubstituted silicon chloride;

silicon dichloride diethoxide (($C_2H_5O$)$_2$SiCl$_2$);

diphenyl silicon dichloride (($C_6H_5$)$_2$SiCl$_2$);

dimethyl silicon dichloride (($CH_3$)$_2$SiCl$_2$) and silicon tetrachloride, the molar ratio of magnesium in the organo magnesium compound to halide in the halogenated compound being 0.5 to 2, at a temperature of from 20° to 60° C. for a period of from 3 to 72 hours in an organic solvent to produce crystalline magnesium halide having a high degree of crystallinity and an intense diffraction line in an x-ray spectrum thereof at lattice distance within the range of from 2.56 to 3.20 Angstroms and titanating the magnesium halide by mixing the magnesium halide with a titanium compound to destroy the high degree of crystallinity to produce a titanated magnesium halide having disorder whereby the titanated magnesium halide has, in an x-ray spectrum thereof, a halo appearing at a lattice distance within the range from 2.56 to 3.30 Angstroms.

11. A process for producing a Ziegler-Natta catalyst comprising:
   a) reacting an organo magnesium compound with a halogenated compound to produce crystalline magnesium halide having a high degree of crystallinity;
   b) determining that the crystalline magnesium halide has, in an x-ray spectrum thereof, an intense diffraction line at lattice distance within the range of from 2.56 to 3.20 Angstroms;
   c) titanating the crystalline magnesium halide by mixing the crystalline magnesium halide with a titanium compound to destroy the high degree of crystallinity to produce a titanated magnesium halide having disorder; and
   d) determining that the titanated magnesium halide has, in an x-ray spectrum thereof, a halo appearing at a lattice distance within the range from 2.56 to 3.30 Angstroms.

12. A process for producing a Ziegler-Natta catalyst, the process comprising reacting phenyl magnesium chloride or magnesium diethoxide with silicon dichloride diethoxide or silicon tetrachloride to produce crystalline magnesium chloride having a high degree of crystallinity and an intense diffraction line in an x-ray spectrum thereof at lattice distance within the range of from 2.56 to 3.20 Angstroms and titanating the magnesium chloride by mixing the magnesium chloride with titanium tetrachloride to destroy the high degree of crystallinity to produce a titanated magnesium chloride having disorder whereby the titanated magnesium chloride has, in an x-ray spectrum thereof, a halo appearing at a lattice distance within the range from 2.56 to 3.30 Angstroms.

13. A process according to claim 12 wherein magnesium diethoxide is reacted with silicon tetrachloride to form magnesium chloride which is titanated at 105° C. for 2 hours.

14. A process involving the production of a Ziegler-Natta catalyst comprising:
   (a) reacting an organomagnesium compound with a halogenated silicon compound to produce a reaction product comprising an electron donor and a crystalline magnesium halide having a high degree of crystallinity and an intense diffraction line in an x-ray spectrum thereof at a lattice distance within the range of 2.56–3.20 Angstroms; and
   (b) titanating the crystalline magnesium halide by mixing the reaction product comprising said magnesium halide and said electron donor with a titanium compound to destroy the high degree of crystallinity and provide a titanated magnesium halide having disorder and in an x-ray spectrum thereof a halo appearing at a lattice distance within the range of 2.56–3.30 Angstroms.

15. The method of claim 14 wherein said organomagnesium compound is selected from the group consisting of a magnesium organohalide and a magnesium alkoxide and said halogenated compound is a halogenated silicon.

16. The process of claim 14 wherein said organomagnesium compound is selected from the group consisting of a magnesium organochloride and a magnesium alkoxide, and said halogenated compound is an organosilicon chloride.

17. The process of claim 14 wherein said electron donor is selected from the group consisting of diphenyl diethoxy silane, diphenyl di(methyl 2 pentoxy) silane, dimethyl diethoxysilane, and diethoxy dichlorosilane.

18. The process of claim 14 further comprising contacting the titanated magnesium halide with an alpha olefin the presence of alkylaluminum compound and an external electron donor to produce a polymer of said alpha olefin.

19. A process for producing a Ziegler-Natta catalyst, the process comprising reacting phenyl magnesium chloride with silicon dichloride diethoxide to produce crystalline magnesium chloride having an intense diffraction line in an x-ray spectrum thereof at lattice distance within the range of from 2.56 to 3.2 Angstroms and titanating the magnesium chloride by mixing the magnesium chloride with titanium tetrachloride at a temperature of 135° C. for a period of two hours to produce a titanated magnesium chloride whereby the titanated magnesium chloride has, in an x-ray spectrum thereof, a halo appearing at a lattice distance within the range from 2.56 to 3.30 Angstroms.

20. A process for producing a Ziegler-Natta catalyst, the process comprising reacting phenyl magnesium chloride with silicon dichloride diethoxide to produce crystalline magnesium chloride having an intense diffraction line in an x-ray spectrum thereof at lattice distance within the range of from 2.56 to 3.20 Angstroms and titanating the magnesium chloride by mixing the magnesium at an initial temperature of 20° C. for 0.5 hours and then at a temperature of 100° C. for two hours to produce a titanated magnesium chloride whereby the titanated magnesium chloride has, in an x-ray spectrum thereof, a halo appearing at a lattice distance within the range from 2.56 to 3.30 Angstroms.

* * * * *

UNITED STATES PATENT AND TRADEMARK OFFICE
CERTIFICATE OF CORRECTION

PATENT NO.    : 6,624,110 B2
DATED         : September 23, 2003
INVENTOR(S)   : Guy Debras and Christian Lamotte It is certified that error appears in the above-identified patent and that said Letters Patent is hereby corrected as shown below:

<u>Title page,</u>
Item [57], ABSTRACT,
Line 8, replace "hasp" with -- has, --;

<u>Column 2,</u>
Lines 57-58, replace "dimethyl" with -- di(methyl --;

<u>Column 3,</u>
Line 42, replace "synchesised" with -- synthesised --; and

<u>Column 6,</u>
Line 47, replace "an&" with -- and --.

Signed and Sealed this

Second Day of March, 2004

JON W. DUDAS
*Acting Director of the United States Patent and Trademark Office*